(12) United States Patent
Zheng et al.

(10) Patent No.: US 12,198,407 B2
(45) Date of Patent: Jan. 14, 2025

(54) ARTIFICIAL INTELLIGENCE-BASED IMAGE PROCESSING METHOD AND APPARATUS, DEVICE, AND STORAGE MEDIUM

(71) Applicant: TENCENT TECHNOLOGY (SHENZHEN) COMPANY LIMITED, Shenzhen (CN)

(72) Inventors: Han Zheng, Shenzhen (CN); Hong Shang, Shenzhen (CN); Xiaoning Wang, Shenzhen (CN); Jianhua Yao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 357 days.

(21) Appl. No.: 17/710,254

(22) Filed: Mar. 31, 2022

(65) Prior Publication Data
US 2022/0222925 A1 Jul. 14, 2022

Related U.S. Application Data

(63) Continuation of application No. PCT/CN2021/077685, filed on Feb. 24, 2021.

(30) Foreign Application Priority Data

Apr. 13, 2020 (CN) .......................... 202010286926.7

(51) Int. Cl.
*G06V 10/77* (2022.01)
*G06V 10/74* (2022.01)
(Continued)

(52) U.S. Cl.
CPC .......... *G06V 10/774* (2022.01); *G06V 10/761* (2022.01); *G06V 10/764* (2022.01);
(Continued)

(58) Field of Classification Search
CPC .................................................. G06V 10/774
See application file for complete search history.

(56) References Cited

U.S. PATENT DOCUMENTS 11,195,279 B1\* 12/2021 Beck .................... G06F 18/214
11,615,264 B2\* 3/2023 Fuchs ................. G06N 3/0455
382/225
(Continued)

FOREIGN PATENT DOCUMENTS

| CN | 109447966 A | 3/2019 |
| CN | 110110811 A | 8/2019 |

(Continued)

OTHER PUBLICATIONS

European Patent Office European Search Report for Application No. 21787699.4 Dec. 12, 2022 9 pages.
(Continued)

*Primary Examiner* — Di Xiao
(74) *Attorney, Agent, or Firm* — ANOVA LAW GROUP PLLC

(57) ABSTRACT

An artificial intelligence-based image processing method includes: obtaining a first sample image of a source domain and a second sample image of a target domain, the first sample image of the source domain carrying a corresponding target processing result; converting the first sample image into a target sample image, the target sample image carrying a corresponding target processing result; training a first image processing model based on the target sample image and the target processing result corresponding to the target sample image, to obtain a second image processing model; and inputting, in response to obtaining a human tissue image of the target domain, the human tissue image into the second image processing model, positioning, by the second image processing model, a target human tissue in the
(Continued)

human tissue image, and outputting position information of the target human tissue in the human tissue image.

14 Claims, 8 Drawing Sheets

(51) Int. Cl.
    *G06V 10/764*     (2022.01)
    *G06V 10/774*     (2022.01)
    *G06V 10/776*     (2022.01)
    *G06V 10/82*     (2022.01)

(52) U.S. Cl.
    CPC ........ *G06V 10/7715* (2022.01); *G06V 10/776* (2022.01); *G06V 10/82* (2022.01); *G06V 2201/03* (2022.01)

(56) References Cited

U.S. PATENT DOCUMENTS

| | | |
|---|---|---|
| 2016/0314600 A1 | 10/2016 | Nguyen et al. |
| 2019/0220977 A1 | 7/2019 | Zhou et al. |
| 2019/0391154 A1* | 12/2019 | Baral ............... G01N 33/57423 |
| 2020/0293828 A1* | 9/2020 | Wang ...................... G06N 3/04 |
| 2021/0304736 A1* | 9/2021 | Kothari ................... G06N 3/08 |
| 2021/0406591 A1 | 12/2021 | Luo et al. |

FOREIGN PATENT DOCUMENTS

| | | | |
|---|---|---|---|
| CN | 110504029 A | 11/2019 | |
| CN | 110705625 A | 1/2020 | |
| CN | 111476783 A | 7/2020 | |
| WO | 2020006963 A1 | 1/2020 | |
| WO | WO-2021050054 A1 * | 3/2021 | ......... G06K 9/00449 |

OTHER PUBLICATIONS

Chen Jiawei et al: "Generative Adversarial Networks for Video-to-Video Domain Adaptation", Proceedings of the AAAI Conference on Artificial Intelligence, vol. 34, No. 04, Feb. 7, 2020, pp. 3462-3469.
The World Intellectual Property Organization (WIPO) International Search Report for PCT/CN2021/077685 May 25, 2021 5 Pages (including translation).
Ming-Yu Liu et al., "Unsupervised Image-to-Image Translation Networks," Advances in neural information processing systems, 2017. 9 pages.
China National Intellectual Property Administration (CNIPA) Office Action 1 for 202010286926.7 Jun. 15, 2022 11 Pages (including translation).

* cited by examiner

ARTIFICIAL INTELLIGENCE-BASED IMAGE PROCESSING METHOD AND APPARATUS, DEVICE, AND STORAGE MEDIUM

RELATED APPLICATION(S)

This application is a continuation application of PCT Patent Application No. PCT/CN2021/077685 filed on Feb. 24, 2021, which claims priority to Chinese Patent Application No. 202010286926.7, entitled "ARTIFICIAL INTELLIGENCE-BASED IMAGE PROCESSING METHOD AND APPARATUS, DEVICE, AND STORAGE MEDIUM" filed on Apr. 13, 2020, all of which are incorporated by reference in entirety.

FIELD OF THE TECHNOLOGY

The present disclosure relates to the field of computer technologies, and in particular, to an artificial intelligence-based image processing method and apparatus, a device, and a storage medium.

BACKGROUND

With the development of computer technologies, the image processing technology has been applied to medical image processing and natural image processing. For a medical image, a human tissue in the image may be positioned by performing image processing, to determine a specific position of the human tissue. There may be distribution differences between generated images due to different methods of medical personnel in different hospitals and use of different devices. When performing image processing, if an image processing model obtained by training sample images of another hospital is directly used for image processing, processing results may be met with limited accuracy.

By using a polyp positioning processing scenario as an example, an image processing method may be carried out as follows. When a certain hospital desires to process human tissue images, human tissue images generated by medical devices in the certain hospital are captured as sample images, and then the sample images are labeled manually, to label positions of polyps in the sample images. An image processing model trained by another hospital is retrained by using the labeled sample images, to obtain a new image processing model. By using the new image processing model, a polyp is positioned on the human tissue image generated by the certain hospital, to output position information of the polyp.

SUMMARY

Embodiments of the present disclosure provide an artificial intelligence-based image processing method and apparatus, a device, and a storage medium, which have good universality and high processing efficiency. The technical solutions are as follows.

In one aspect, the present disclosure provides an artificial intelligence-based image processing method including: obtaining a first sample image of a source domain and a second sample image of a target domain, the first sample image of the source domain carrying a corresponding target processing result, and the first sample image and the second sample image being sample human tissue images; converting, according to an image distribution difference between the first sample image and the second sample image, the first sample image into a target sample image, the target sample image carrying a corresponding target processing result; training a first image processing model based on the target sample image and the target processing result corresponding to the target sample image, to obtain a second image processing model; and inputting, in response to obtaining a human tissue image of the target domain, the human tissue image into the second image processing model, positioning, by the second image processing model, a target human tissue in the human tissue image, and outputting position information of the target human tissue in the human tissue image.

In some embodiments, the conversion module is configured to: encode the first sample image according to an image distribution difference of a target encoding space and the first sample image on an image distribution rule, to obtain a first sample image code; and generate, according to an image distribution difference of the second sample image and the target encoding space on the image distribution rule, the target sample image that conforms to the image distribution rule of the second sample image based on the first sample image code.

In another aspect, the present disclosure provides an artificial intelligence-based image processing apparatus, the apparatus including: a memory storing computer program instructions; and a processor coupled to the memory and configured to execute the computer program instructions and perform: obtaining a first sample image of a source domain and a second sample image of a target domain, the first sample image of the source domain carrying a corresponding target processing result, and the first sample image and the second sample image being sample human tissue images; converting, according to an image distribution difference between the first sample image and the second sample image, the first sample image into a target sample image, the target sample image carrying a corresponding target processing result; training a first image processing model based on the target sample image and the target processing result corresponding to the target sample image, to obtain a second image processing model; and inputting, in response to obtaining a human tissue image of the target domain, the human tissue image into the second image processing model, positioning, by the second image processing model, a target human tissue in the human tissue image, and outputting position information of the target human tissue in the human tissue image.

In yet another aspect, the present disclosure provides a non-transitory computer-readable storage medium storing computer program instructions executable by at least one processor to perform: obtaining a first sample image of a source domain and a second sample image of a target domain, the first sample image of the source domain carrying a corresponding target processing result, and the first sample image and the second sample image being sample human tissue images; converting, according to an image distribution difference between the first sample image and the second sample image, the first sample image into a target sample image, the target sample image carrying a corresponding target processing result; training a first image processing model based on the target sample image and the target processing result corresponding to the target sample image, to obtain a second image processing model; and inputting, in response to obtaining a human tissue image of the target domain, the human tissue image into the second image processing model, positioning, by the second image processing model, a target human tissue in the human tissue image, and outputting position information of the target human tissue in the human tissue image.

The technical solutions provided in the embodiments of the present disclosure include at least the following beneficial effects:

In the embodiments of the present disclosure, sample human tissue images of a source domain and a target domain are obtained, and image conversion is performed on a human tissue image of the source domain according to an image distribution difference between the sample human tissue images of two domains, to obtain a training sample for training a first image processing model. In this way, a second image processing model applicable to the target domain can be obtained, to process a human tissue image of the target domain. In this process, a target sample image obtained after conversion conforms to an image distribution rule of the human tissue image of the target domain and carries a corresponding target processing result. Therefore, there is no need to manually re-label, thereby removing a manual labeling step, reducing labor costs, improving model training efficiency, and thus improving image processing efficiency. By obtaining the human tissue image of the target domain, the training sample can be automatically obtained through image conversion. The method has better universality and higher applicability.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

Figure 1:
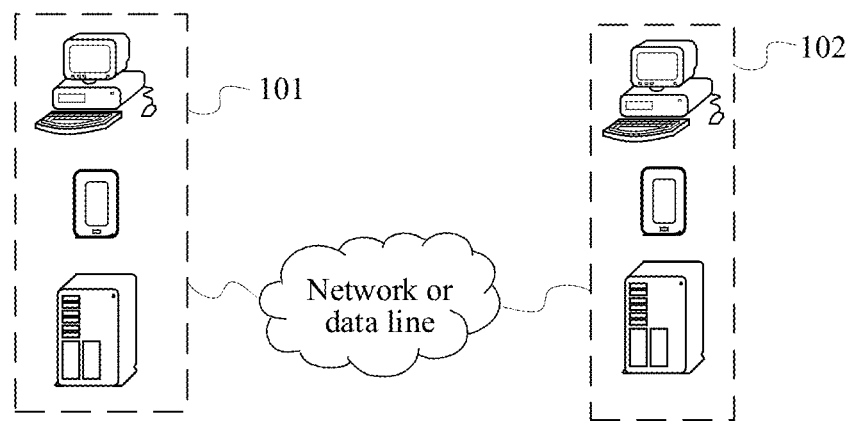
FIG. 1 is a schematic implementation environment of an artificial intelligence-based image processing method according to embodiment(s) of the present disclosure.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

The terms "first", "second", and the like in the present disclosure are used for distinguishing between same items or similar items of which effects and functions are basically the same. It is to be understood that, the "first", "second", and "nth" do not have a dependency relationship in logic or time sequence, and a quantity and an execution order thereof are not limited.

In the present disclosure, the term "at least one" means one or more, and "at least two" means two or more. For example, at least two node devices mean two or more node devices.

In certain existing technologies, after sample images are captured, the captured sample images need to be re-labeled, and then model training is performed, which causes longer time-consumption and higher labor costs. If a plurality of different hospitals needs to perform image processing, repeating this process may consume a lot of manpower, material resources, and time. Therefore, the method has poor universality and low efficiency.

Terms involved in the present disclosure are explained below.

Artificial intelligence (AI) is a theory, method, technology, and application system that uses a digital computer or a machine controlled by a digital computer to simulate, extend, and expand human intelligence, perceive the environment, acquire knowledge, and use knowledge to obtain an optimal result. In other words, artificial intelligence is a comprehensive technology of computer science, which attempts to understand the essence of intelligence and produce a new type of intelligent machine that can react in a similar way to human intelligence. Artificial intelligence is to study design principles and implementation methods of various intelligent machines, so that the machines have the functions of perception, reasoning, and decision-making.

The artificial intelligence technology is a comprehensive discipline, covering a wide range of fields including both a hardware-level technology and a software-level technology. The basic artificial intelligence technology generally includes technologies such as sensors, dedicated artificial intelligence chips, cloud computing, distributed storage, big data processing technologies, operating/interaction systems, and mechatronics. An artificial intelligence software technology includes fields such as a computer vision technology, a speech processing technology, a natural language processing technology, and machine learning/deep learning.

Computer vision in the computer vision (CV) technology is a science that studies how to use a machine to "see", and furthermore, is machine vision in which a camera and a computer are used for replacing human eyes to perform recognition, tracking, and measurement, and the like on a target, and further perform graphics processing, so that the computer processes the target into an image more suitable for human eyes to observe or an image transmitted to an instrument for detection. As a scientific subject, the computer vision studies related theories and technologies and attempts to establish an artificial intelligence system that can obtain information from images or multidimensional data. The computer vision technology generally includes technologies such as image processing, image recognition, image semantic understanding, image retrieval, optical character recognition (OCR), video processing, video semantic understanding, video content/behavior recognition, three-dimensional object reconstruction, a 3-dimensional (3D) technology, virtual reality, augmented reality, synchronous positioning, and map construction, and further include biological feature recognition technologies such as common face recognition and fingerprint recognition.

Source domain: a domain that currently has a fixed dataset that has been captured and well-labeled.

Target domain: data of the target domain is related to data in the source domain, but there is distribution deviation and sources of two domains are different.

Domain adaptation: a technology dedicated to solving a domain of which model performance is degraded due to data distribution differences in machine learning.

Domain mapping: a method for solving a problem of domain adaptation in machine learning.

With the research and progress of the artificial intelligence technology, the artificial intelligence technology is studied and applied to a plurality of fields, for example, a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the artificial intelligence technology will be applied to more fields, and play an increasingly important role.

The solutions provided in the embodiments of the present disclosure relate to technologies, for example, an artificial neural network and transfer learning in machine learning of artificial intelligence, and relate to technologies, for example, image processing and image semantic understanding in the computer vision technology, which are described by using the following embodiments:

FIG. 1 is an implementation environment of an artificial intelligence-based image processing method according to an embodiment of the present disclosure. Referring to FIG. 1, the implementation environment includes a plurality of computer devices. The plurality of computer devices may implement data exchange in a wired connection manner, or implement data exchange in a wireless network connection manner. This is not limited in this embodiment of the present disclosure.

In certain embodiment(s), the term "computer device" is interchangeable with the term "computing device."

In this embodiment of the present disclosure, a computer device 101 may be configured to process an image. In some embodiments, the image is a medical image, that is, a human tissue image. A process of processing the image is a process of positioning a target human tissue in the image, for example, a scenario where a polyp is positioned in a colorectal image, a polyp is positioned in a gallbladder image, a tumor is positioned in a brain image, or the like. In certain embodiment(s), the image processing method may alternatively be applicable to another scenario where the human tissue image is processed, and details are not listed one by one in this embodiment of the present disclosure.

In some embodiments, the computer device 101 captures a human tissue image, and processes the captured human tissue image. In some other embodiments, a computer device 102 is configured to capture a human tissue image and send the captured human tissue image to the computer device 101, and the computer device 101 provides an image processing service. A specific implementation is not limited in this embodiment of the present disclosure.

In certain embodiment(s), both the computer device 101 and the computer device 102 may be provided as terminals, or be provided as servers. This is not limited in this embodiment of the present disclosure.

Figure 2:
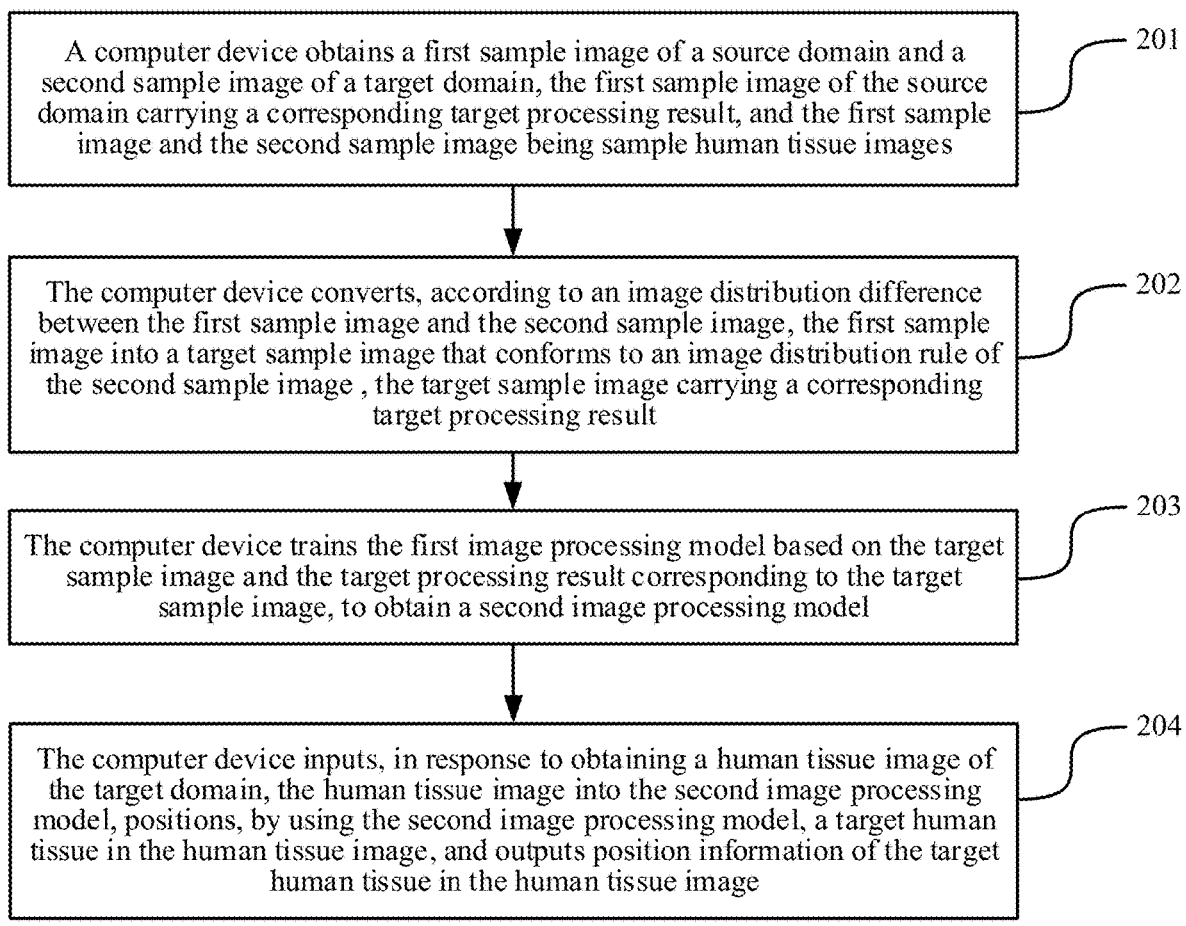
FIG. 2 is a schematic flowchart of an artificial intelligence-based image processing method according to embodiment(s) of the present disclosure.

FIG. 2 is a flowchart of an artificial intelligence-based image processing method according to an embodiment of the present disclosure. Referring to FIG. 2, the method includes the following steps.

201. Obtain, by a computer device, a first sample image of a source domain and a second sample image of a target domain, the first sample image of the source domain carrying a corresponding target processing result, and the first sample image and the second sample image being sample human tissue images.

The source domain is a domain of which a generated image carries a corresponding target processing result, that is, labeled data has existed in an image generated by the source domain. In some embodiments, the source domain is a domain in which a sample image that has been currently configured to train an image processing model is located, for example, the source domain is an applicable domain of a current first image processing model, or a generation domain of images with labeled data in some open-source databases.

The target domain is a domain in which a sample image that are not currently configured to train the image processing model is located, that is, a second sample image generated by the target domain does not carry a corresponding target processing result, and labeled data does not exist.

The target processing result is used for indicating position information of a target human tissue in the image, that is, a real position of the target human tissue in the image.

For example, two domains are different hospitals, different medical devices in a hospital, or different personnel in a hospital, and images generated by the two domains are human tissue images. Due to different methods of medical personnel in different hospitals and use of different devices, there may be distribution differences between the generated images. By using an example in which the two domains are different hospitals, the source domain is a hospital A, and the target domain is a hospital B. Sample images have been captured from the hospital A currently, and then are trained so that a first image processing model is obtained. When the first image processing model of the hospital A is configured to process human tissue images generated by the hospital B, a poor processing result may be resulted from an image distribution difference between the two hospitals.

202. Convert, by the computer device according to an image distribution difference between the first sample image and the second sample image, the first sample image into a target sample image, the target sample image carrying a corresponding target processing result.

In certain embodiment(s), the target sample image conforms to an image distribution rule of the second sample image.

Because the first sample image and the second sample image are images generated by different domains, there may be the image distribution difference between the two domains. The computer device obtains the sample images of the two domains, to analyze the image distribution difference between the images generated by the two domains, thereby converting, according to the image distribution difference, the first sample image with labeled data of the source domain into the target sample image that conforms to an image distribution rule of the target domain.

The manner may convert a sample of the source domain into a sample of the target domain, so that the sample obtained by conversion has labeled data, and may be used as a training sample. In this process, only the second sample image of the target domain needs to be obtained, and there is no need to manually label the second sample image of the target domain to obtain the training sample, thereby reducing a labeling step, reducing labor costs, effectively improving model training efficiency, further improving image processing efficiency, and improving universality of the image processing method.

203. Train, by the computer device, a first image processing model based on the target sample image and the target processing result corresponding to the target sample image, to obtain a second image processing model.

The first image processing model is obtained by training based on the first sample image of the source domain, is obtained by training based on an image of another domain, or is an initial image processing model. This is not limited in this embodiment of the present disclosure.

If the first image processing model is a trained model, because there may be a distribution difference between images generated by different domains, an effect that the first image processing model is directly used for performing image processing on an image of the target domain may be poor. If the first image processing model is an initial model, a processing effect thereof is more uncertain. Therefore, the computer device may train the first image processing model by using a training sample of the target domain, and the second image processing model obtained after training may be applicable to the target domain.

In the step 202, through an image conversion process, the computer device converts the first sample image of the source domain carrying the target processing result into the target sample image of the "target domain". The image distribution rule of the target sample image is the same as an image distribution rule of a generated image of the target domain. Therefore, the computer device may replace the second sample image of the target domain with the target sample image, and use the target sample image as the training sample to train the first image processing model.

The second image processing model is obtained by training based on the target sample image of the "target domain". In the training process, the second image processing model has learned to how to process an image that conforms to the image distribution rule of the target domain, thereby processing the image generated by the target domain. In addition, the training sample on which the training process relies is obtained by image conversion, and there is no need to manually label, thereby greatly reducing labor costs and avoiding a lot of time-consumption caused by labeling. Therefore, efficiency in the model training process is effectively improved.

204. Input, by the computer device in response to obtaining a human tissue image of the target domain, the human tissue image into the second image processing model, position, by using the second image processing model, a target human tissue in the human tissue image, and output position information of the target human tissue in the human tissue image.

In steps 201 to 203, the computer device obtains the second image processing model applicable to the target domain through training, and generates the human tissue image in the target domain. When image processing needs to be performed on the human tissue image, the human tissue image may be inputted into the second image processing model, and the second image processing model processes the human tissue image according to a learned image processing manner, to output a processing result.

In some embodiments, the second image processing model may perform feature extraction on the inputted image, classify based on the feature extraction, and determine whether regions in the human tissue image include the target human tissue, thereby further positioning for a region including the target human tissue, to obtain position information.

For example, in an example, the human tissue image is a colorectal image, the target human tissue is a polyp, and the process of processing the image is a process of positioning the polyp in the colorectal image. In certain embodiment(s), a colorectal image of the hospital A has labeled data, but that of the hospital B does not have. When a colorectal image generated by the hospital B is intended to be processed, the colorectal image of the hospital B is first captured, and the colorectal image of the hospital A is converted into a target colorectal image undifferentiated with the colorectal image of the hospital B according to an image distribution difference between the images generated by the hospital A and the hospital B. Because the target colorectal image is obtained by converting based on the colorectal image with the labeled data of the hospital A, the target colorectal image also has the labeled data. In this way, the first image processing model is trained by using the target colorectal image, and the obtained second image processing model may position a polyp in the colorectal image generated by hospital B.

In the embodiments of the present disclosure, sample human tissue images of a source domain and a target domain are obtained, and image conversion is performed on a human tissue image of the source domain according to an image distribution difference between the sample human tissue images of the two domains, to obtain a training sample for training a first image processing model. In this way, a second image processing model applicable to the target domain can be obtained, to process a human tissue image of the target domain. In this process, a target sample image obtained after conversion conforms to an image distribution rule of the human tissue image of the target domain, and carries a corresponding target processing result. Therefore, there is no need to manually re-label, thereby removing a manual labeling step, reducing labor costs, improving model training efficiency, and thus improving image processing efficiency. By obtaining the human tissue image of the target domain, the training sample can be automatically obtained through image conversion. The method has better universality and higher applicability.

Figure 3:
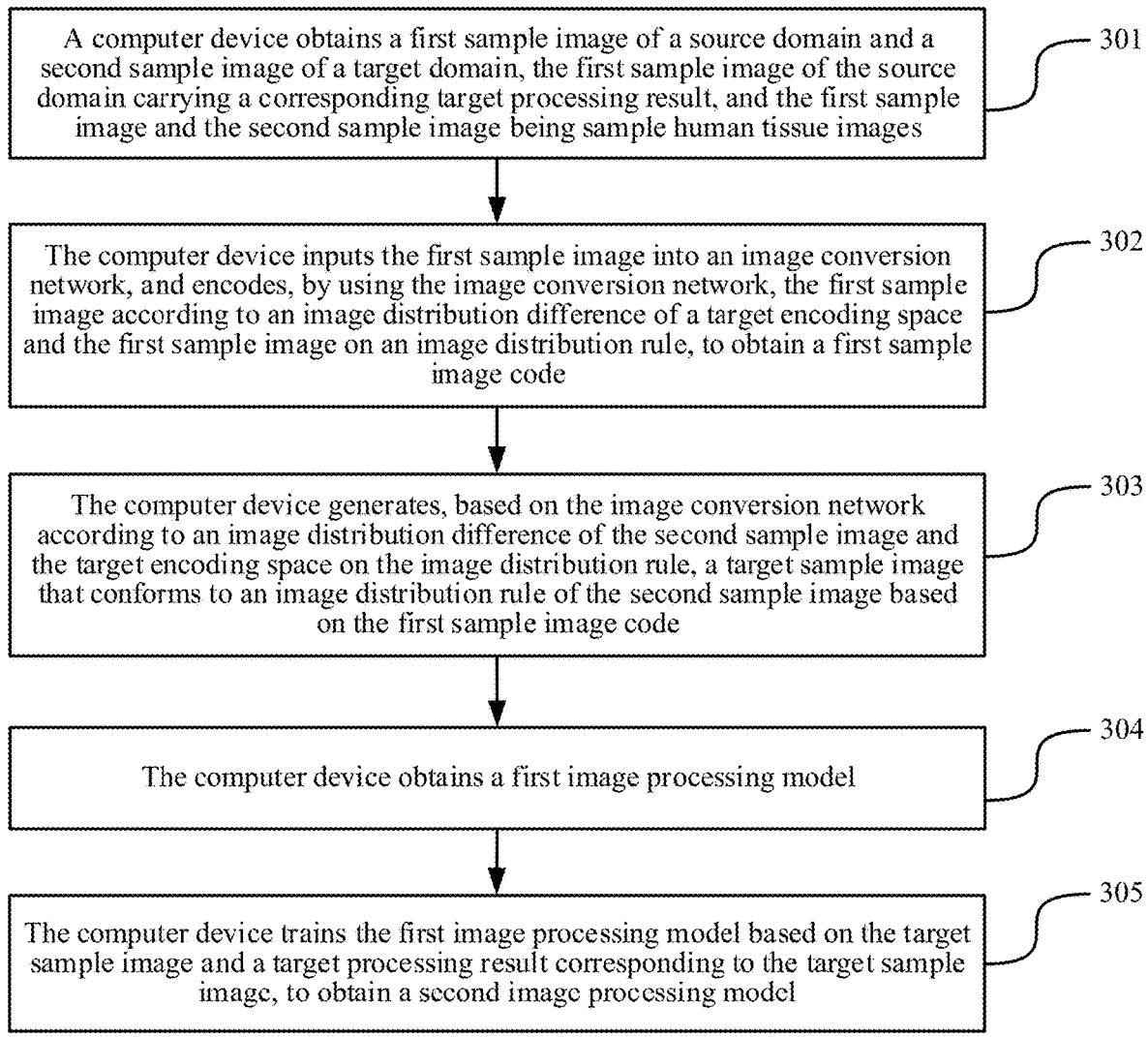
FIG. 3 is a schematic flowchart of a method of training an image processing model according to embodiment(s) of the present disclosure.
Figure 4:
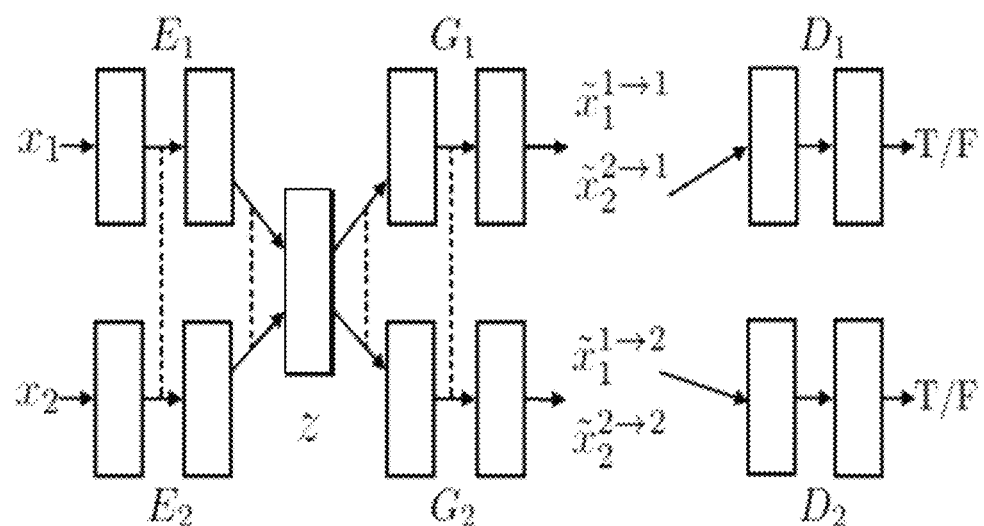
FIG. 4 is a schematic structural diagram of an image conversion network according to embodiment(s) of the present disclosure.

In the embodiment shown in FIG. 2, a process of the artificial intelligence-based image processing method is briefly described. In this method, by using a domain mapping technology in a domain application technology, a sample of a source domain is converted into a sample of a target domain, thereby training a first image processing model to obtain a second image processing model, and performing image processing on a human tissue image generated by the target domain by using the second image processing model. In an embodiment shown in FIG. 3, a process of training the second image processing model is described below in detail. FIG. 3 is a flowchart of a method of training an image processing model according to an embodiment of the present disclosure. Referring to FIG. 3, the method may include the following steps.

301. Obtain, by a computer device, a first sample image of a source domain and a second sample image of a target domain, the first sample image of the source domain carrying a corresponding target processing result, and the first sample image and the second sample image being sample human tissue images.

In some embodiments, the computer device may capture sample images of the source domain and the target domain, and use the sample images as a data basis of model training, to train a second image processing model applicable to the target domain. Currently, the source domain has a first sample image with labeled data, but a second sample image of the target domain does not have the labeled data. Therefore, model training cannot be performed on a first image processing model by using the second sample image of the target domain. The computer device may process the two images in the following steps 302 and 303, to obtain suitable training samples.

For a target processing result, in the model training process, whether a model during training processes an image is determined by comparing the target processing result with an outputted result of the model, to know whether there is a need to continuously train the model, so that the target processing result or a result quite close to the target processing result may be obtained when the image is processed by the trained model.

In some embodiments, a process that the computer device obtains the first sample image and the second sample image may be implemented in a plurality of manners. In some embodiments, the first sample image and the second sample image are stored in image databases, and the computer device extracts the first sample image and the second sample image from the image databases.

For example, the first sample image is stored in an open-source image database, the computer device extracts the first sample image from the open-source image database, and the first sample image carries the corresponding target processing result. The second sample image is stored in an image database to which the target domain belongs, and the computer device extracts the second sample image from the image database. For example, the target domain is a specific hospital, second sample images generated by the hospital are stored in a database of a server of the hospital, and the computer device may extract them from the database.

In some other embodiments, the first sample image and the second sample image are stored in the computer device. During model training, the computer device extracts them from a local database. This is not limited in this embodiment of the present disclosure.

302. Input, by the computer device, the first sample image into an image conversion network, and encode, by the image conversion network, the first sample image according to an image distribution difference of a target encoding space and the first sample image on an image distribution rule, to obtain a first sample image code.

The second sample image of the target domain does not have the labeled data, and if the second sample image is used for model training, the second sample image needs to be manually labeled. In this way, time-consumption is too large, and labor costs are excessively high. Therefore, the computer device may analyze the image distribution difference between the sample images in the two domains, perform image conversion by using the image distribution difference as a basis, and generate suitable training samples by using the second sample image and the first sample image carrying the corresponding target processing result.

In some embodiments, a process of performing image conversion according to the image distribution difference may be implemented by using the image conversion network. The image conversion network encodes the first sample image, and maps the first sample image to the target encoding space; and describes the first sample image through the image distribution rule of the target encoding space, and subsequently converts the first sample image into a target sample image that conforms to an image distribution rule of the target domain.

In the encoding process, the computer device converts the first sample image into a first sample image code according to a mapping relationship between the target encoding space and the first sample image, and the mapping relationship is a conversion relationship from the first sample image to the target encoding space. The mapping relationship is a preset relationship, or is obtained by training on the first sample image.

In some embodiments, the image distribution rule is a pixel distribution rule, for example, the image distribution rule is a grayscale distribution rule or a brightness distribution rule. Correspondingly, the image distribution difference is a grayscale distribution difference or a brightness distribution difference.

For example, a grayscale distribution rule in the first sample image is that: a grayscale distribution range is 0 to 75; and a grayscale distribution rule in the target encoding space is that: a grayscale distribution range is 180 to 255. The computer device increases a grayscale of each pixel point in the first sample image by 180, to obtain the first sample image code.

The image conversion network is a network trained by using the first sample image and the second sample image, and a training process thereof refers to the following step 303. Details are not described herein.

303. Generate, by the computer device based on the image conversion network according to an image distribution difference of the second sample image and the target encoding space on an image distribution rule, a target sample image that conforms to an image distribution rule of the second sample image based on the first sample image code.

After encoding the first sample image, the computer device may further reconstruct the first sample image code in the target encoding space, to generate the target sample image. In some embodiments, the generation process is implemented based on a mapping relationship between the second sample image and target encoding space, and the mapping relationship is a conversion relationship from the target encoding space to the second sample image. The target sample image conforms to the image distribution rule of the second sample image.

In some embodiments, the image conversion network includes an encoding network and a generation network, the encoding process in step 302 is implemented through the encoding network, and the generation process in step 303 is implemented through the generation network.

In some embodiments, the computer device inputs the first sample image into the encoding network of the image conversion network. The encoding network encodes the first sample image according to the image distribution difference of the target encoding space and the first sample image on the image distribution rule, to obtain the first sample image code. The generation network generates, according to the image distribution difference of the second sample image and the target encoding space on the image distribution rule, the target sample image that conforms to the image distribution rule of the second sample image based on the first sample image code.

For the image conversion network, the image conversion network is obtained by training based on a first sample image and a second sample image, and a process of training the image conversion network is implemented by performing the following steps 1 to 6:

Step 1. A computer device inputs the first sample image and the second sample image into an initial image conversion network, and encodes, by using the initial image conversion network, the first sample image according to an image distribution difference of a target encoding space and the first sample image on an image distribution rule, to obtain a first sample image code.

Step 2. The computer device encodes the second sample image according to an image distribution difference of the target encoding space and the second sample image on the image distribution rule, to obtain a second sample image code.

In step 1 and step 2, the initial image conversion network first maps sample images of two domains into the same encoding space, namely, the target encoding space. In the target encoding space, the sample images of the two domains are described in the same encoding manner and the same image description manner. That is, in the target encoding space, a description manner of the first sample image is the same as that of the second sample image, thereby reducing an image distribution difference between the sample images of the two domains.

Step 3. The computer device generates, according to an image distribution difference of the first sample image and the target encoding space on the image distribution rule, a third sample image and a fourth sample image based on the first sample image code and the second sample image code.

In step 3, the computer device generates the third sample image and the fourth sample image that conform to an image distribution rule of the first sample image based on the first sample image code and the second sample image code. In this process, the first sample image of a source domain is reconstructed to obtain the third sample image, and the second sample image of a target domain is converted in the source domain to obtain the fourth sample image.

Step 4. The computer device generates, according to an image distribution difference of the second sample image and the target encoding space on the image distribution rule, a fifth sample image and a sixth sample image based on the first sample image code and the second sample image code.

In step 4, the computer device generates the fifth sample image and the sixth sample image that conform to an image distribution rule of the second sample image based on the first sample image code and the second sample image code. In this process, the second sample image of the target domain is reconstructed to obtain the sixth sample image, and the first sample image of the source domain is converted into the target domain to obtain the fourth sample image.

Through step 3 and step 4, whether a generated image is the same as an original image may be discriminated according to a generated sample image, to determine a generation effect of the sample image. The generation effect may be improved in the process of training the initial image conversion network, so that the target sample image obtained by performing image conversion on the first sample image by using an image conversion network obtained in this manner is more accurate.

Step 5. The computer device obtains an image classification result of the first sample image, the second sample image, the third sample image, the fourth sample image, the fifth sample image, and the sixth sample image, the image classification result being used for indicating that an image is an original image or a generated image.

After generating the third sample image, the fourth sample image, the fifth sample image, and the sixth sample image, the computer device may discriminate the generated image and the original image (the first sample image and the second sample image), to discriminate whether the image is the generated image or the original image, where the generated image is an image which is generated.

A generative adversarial structure is formed through a generation and discrimination process. Adversarial training is performed on the initial image conversion network by using the generative adversarial structure, so that the generated sample image is undifferentiated with the original image and cannot be discriminated. In this way, the first sample image is converted by using this image conversion network, to obtain the target sample image undifferentiated with the second sample image of the target domain. The target sample image may match a feature of an image generated in the target domain and conform to an image distribution rule of the image generated in the target domain. By performing model training on the image, the obtained model may more accurately process the image generated in the target domain.

In some embodiments, the discrimination step may be implemented through a discriminator. The computer device inputs the first sample image, the second sample image, the third sample image, the fourth sample image, the fifth sample image, and the sixth sample image into the discriminator, and the discriminator discriminates the sample images and outputs the image classification result.

Step 6. The computer device adjusts a network parameter of the initial image conversion network according to an accuracy rate of the image classification result until a first target condition is conformed, to obtain the image conversion network.

After obtaining the image classification result, the computer device may determine a difference between one of the generated sample images and the original image in step 5 according to the accuracy rate of the image classification result. If the difference between the generated sample image and the original image is not large, when the generated sample image and the original image are discriminated, the image classification result is as follows: a probability that the image is the generated image is 50%, and a probability that the image is the original image is 50%. If the difference between the generated sample image and the original image is large, the image classification result may be that: the probability that the image is the generated image is C, and the probability that the image is the original image is D. C is much greater than D, or D is much greater than C. For example, C is 95% and D is 5%, or C is 5% and D is 95%.

For the network parameter of the initial image conversion network being an initial value, in the model training process, the initial value may be adjusted according to the accuracy rate, so that the sample image codes after encoding are more accurate and the generated sample images are more realistic when the initial image conversion network encodes and generates the sample images, thereby improving performance of the initial image conversion network, and improving accuracy of the target sample image obtained by performing image conversion by using the trained image conversion network.

For the first target condition, the first target condition is not limited in this embodiment of the present disclosure.

In some embodiments, the first target condition is that a difference between the accuracy rate of the image classification result and a target accuracy rate is less than a difference threshold. The target accuracy rate and the difference threshold are set by a person skilled in certain existing technologies, which is not limited in this embodiment of the present disclosure. In some embodiments, the target accuracy rate is 50%. The difference threshold is a value close to 0. When the accuracy rate of the image classification result is close to 50%, the sample image generated by the image conversion network and a real image cannot be discriminated, that is, the generated sample image is the same as the real image.

In some embodiments, in the training process, abilities that the computer device encodes and generates the sample image may also be trained. The computer device may respectively obtain a first similarity between the third sample image and the fourth sample image, a second similarity between the fifth sample image and the sixth sample image, a third similarity between the first sample image and the third sample image, a fourth similarity between the first sample image and the fifth sample image, a fifth similarity between the second sample image and the fourth sample image, and a sixth similarity between the second sample image and the sixth sample image.

The first similarity and the second similarity are used for reflecting, after an image in one domain is encoded and converted into an image in an other domain, a similarity between the image in the other domain and a generated image in the other domain. The third similarity and the fourth similarity are used for reflecting a similarity between an image in one domain after encoding and re-generation (reconstruction) and an original image. The fifth similarity and the sixth similarity are used for reflecting, after an image in one domain is encoded and converted into an image in an other domain, a similarity between the image in the other domain and an original image in the other domain.

Correspondingly, in the adjustment process, the computer device may also perform adjustment referring to the plurality of similarities, and the network parameter obtained by adjustment may improve accuracy of steps of encoding and generation. In certain embodiment(s), the computer device adjusts the network parameter of the initial image conversion network according to the accuracy rate of the image classification result, the first similarity, the second similarity, the third similarity, the fourth similarity, the fifth similarity, and the sixth similarity until the first target condition is conformed.

In this implementation, the first target condition is that the difference between the accuracy rate of the image classification result and the target accuracy rate is less than the difference threshold, and the first similarity, the second similarity, the third similarity, the fourth similarity, the fifth similarity, and the sixth similarity converge. For example, the first similarity, the second similarity, the third similarity, the fourth similarity, the fifth similarity, and the sixth similarity are close to 0 or reach a minimum value.

In some embodiments, the computer device may further provide a cyclic verification manner. In the above process, an image obtained after an image of one domain is encoded and generated into an other domain is re-coded, and the obtained image code may be the same as an image code mapped to the target encoding space in the domain. In some embodiments, the computer device inputs the fourth sample image and the sixth sample image into the initial image conversion network, and encodes, by using the initial image conversion network, the fourth sample image and the sixth sample image, to obtain a third sample image code and a fourth sample image code. The computer device respectively obtains a seventh similarity between the third sample image code and the first sample image code and an eighth similarity between the fourth sample image code and the second sample image code.

Correspondingly, in the adjustment process, the computer device may also refer to the seventh similarity and the eighth similarity, that is, in addition to referring to the accuracy rate of the image classification result, the first similarity, the second similarity, the third similarity, the fourth similarity, the fifth similarity, and the sixth similarity, the computer device may also adjust the network parameter of the initial image conversion network according to the seventh similarity and the eighth similarity until the first target condition is conformed.

In this implementation, the first target condition is that the difference between the accuracy rate of the image classification result and the target accuracy rate is less than the difference threshold, and the first similarity, the second similarity, the third similarity, the fourth similarity, the fifth similarity, the sixth similarity, the seventh similarity, and the eighth similarity converge.

In certain embodiment(s), the above only provides several first target conditions, and the first target condition may also be another condition, for example, the first target condition may also be that a quantity of iterations reaches a target quantity. This is not limited in this embodiment of the present disclosure.

In some embodiments, the image conversion network adopts a network structure of unit. A process of training the image conversion network is as follows: a pair of samples are selected from sample images in a source domain and a target domain, where x1 represents a sample of the source domain, x2 represents a sample of the target domain, and the two are respectively mapped to an encoding space Z by using encoding networks E1 and E2. To ensure that codes of the encoding space may include enough information to restore original states of the samples, variational autoencoders (VAEs) are used for encoding in mapping relationships from the samples and the encoding space, thereby ensuring that the samples can be effectively restored to the original images after being mapped to the encoding space. Then, codes (or regarded as image features) of images mapped to the encoding space are respectively re-generated as the samples of the source domain and the target domain by using generation networks G1 and G2, and the generated samples and real samples (that is, the original samples, or the samples x1 and x2 inputted into the encoding networks) are discriminated by using discriminators D1 and D2, to implement generative training. Actually, a network pair formed by each generation network G and each discriminator D is referred to as a generative adversarial network (GAN), codes in the encoding space are generated as samples that cannot be discriminated by the discriminators in a manner of generative adversarial training, to achieve a generation effect of the samples.

In this example, a constraint function of the entire model is shown in formula (1):

$$\min_{E_1,E_2,G_1,G_2} \max_{D_1,D_2} \mathcal{L}_{VAE_1}(E_1, G_1) + \mathcal{L}_{GAN_1}(E_2, G_1, D_1) + \mathcal{L}_{CC_1}(E_1, G_1, E_2, G_2) \quad (1)$$

$$\mathcal{L}_{VAE_2}(E_2, G_2) + \mathcal{L}_{GAN_2}(E_1, G_2, D_2) + \mathcal{L}_{CC_2}(E_2, G_2, E_1, G_1).$$

where, LVAE represents a loss function of a VAE, and constraint targets thereof are an encoder E and a generator G. The LVAE refers to a similarity between an image obtained after an image of one domain is encoded and reconstructed and an original image. LGAN represents an adversarial loss function, constraint targets thereof are the encoder E1, the generator G2, and the discriminator D2. The LGAN means that after a code generated by the sample of the source domain is generated by the generator of the target domain as a target sample, the target sample needs to be indistinguishable from a real sample of the target domain, and after a code generated by the sample of the target domain is generated as the sample of the source domain, the sample of the source domain needs to be indistinguishable from a real sample of the source domain. In addition, a cyclic loss function Lcc is also provided, constraint targets thereof are the two encoders and the two generators, and a function thereof is that a code obtained by repeating the encoding process by using a sample generated by a generator of an other domain after a sample of a corresponding domain is encoded may be similar to a code of an original sample.

The LVAE is obtained by using the following formula (2):

$$\mathcal{L}_{VAE_1}(E_1, G_1) = \lambda_1 KL(q_1(z_1|x_1)\|p_\eta(z)) - \lambda_2 \mathbb{E}_{z_1 \sim q_1(z_1|x_1)}[\log p_{G_1}(x_1|z_1)]$$

$$\mathcal{L}_{VAE_2}(E_2, G_2) = \lambda_1 KL(q_2(z_2|x_2)\|p_\eta(z)) - \lambda_2 \mathbb{E}_{z_2 \sim q_2(z_2|x_2)}[\log p_{G_2}(x_2|z_2)]. \quad (2)$$

The LGAN is obtained by using the following formula (3):

$$\mathcal{L}_{GAN_1}(E_2, G_1, D_1) = \lambda_0 \mathbb{E}_{x_1 \sim P_{x_1}}[\log D_1(x_1)] + \lambda_0 \mathbb{E}_{z_2 \sim q_2(z_2|x_2)}[\log(1 - D_1(G_1(z_2)))]$$

$$\mathcal{L}_{GAN_2}(E_1, G_2, D_2) = \lambda_0 \mathbb{E}_{x_2 \sim P_{x_2}}[\log D_2(x_2)] + \lambda_0 \mathbb{E}_{z_1 \sim q_1(z_1|x_1)}[\log(1 - D_2(G_2(z_1)))]. \quad (3)$$

The LGAN is obtained by using the following formula (4):

$$\mathcal{L}_{CC_1}(E_1, G_1, E_2, G_2) = \lambda_3 KL(q_1(z_1|x_1)\|p_\eta(z)) + \lambda_3 KL(q_2(z_2|x_1^{1\to 2})\|p_\eta(z)) - \lambda_4 \mathbb{E}_{z_2 \sim q_2(z_2|x_1^{1\to 2})}[\log p_{G_1}(x_1|z_2)]$$

$$\mathcal{L}_{CC_2}(E_2, G_2, E_1, G_1) = \lambda_3 KL(q_2(z_2|x_2)\|p_\eta(z)) + \lambda_3 KL(q_1(z_1|x_2^{2\to 1})\|p_\eta(z)) - \lambda_4 \mathbb{E}_{z_1 \sim q_1(z_1|x_2^{2\to 1})}[\log p_{G_2}(x_2|z_1)] \quad (4)$$

where, x1 is the first sample image of the source domain, and x2 is the second sample image of the target domain. KL is a kullback-keibler divergence (KL) distance, referred to as a relative entropy, or also referred to as a KL divergence.

In step 302 and step 303, according to the image distribution difference between the first sample image and the second sample image, the first sample image is converted into the target sample image that conforms to the image distribution rule of the second sample image, and the target sample image carries the corresponding target processing result. The process is described by using an example in which the image conversion network implements the encoding and generation process. In certain embodiment(s), the process may also be implemented in other manners, for example, the computer device directly performs the steps of encoding and generation. This is not limited in this embodiment of the present disclosure.

304. Obtain, by the computer device, a first image processing model.

The first image processing model is obtained by training based on the first sample image of the source domain, is obtained by training based on an image of another domain, or is an initial image processing model. This is not limited in this embodiment of the present disclosure.

If the first image processing model is obtained by training based on the first sample image of the source domain, in this embodiment of the present disclosure, the first sample image and the target sample image obtained after the first sample image is converted are used as training samples. The sample images of the two domains are combined as a training sample set, to train an initial model, so that a second image processing model with a better processing effect is obtained.

305. Train, by the computer device, the first image processing model based on the target sample image and the target processing result corresponding to the target sample image, to obtain the second image processing model.

The computer device obtains the first image processing model, and also generates the target sample image as a training sample. Therefore, the first image processing model is trained by using the training sample. Because the target sample image obtained after image conversion comes from the first sample image of the source domain, labeled information (namely, the target processing result) carried by the first sample image of the source domain may still be used, and by fine-tuning the model trained on the first sample image by using the sample, a model applicable to the target domain may be finally obtained.

In some embodiments, the training process is as follows: the computer device inputs the target sample image into the first image processing model, positions, by using the first image processing model, a target human tissue in the target sample image, and outputs predicted position information of the target human tissue in the target sample image; obtains accuracy of the predicted position information based on the predicted position information and target position information of the target human tissue in the target processing result; and adjusts a model parameter of the first image processing model based on the accuracy until a second target condition is conformed, to obtain the second image processing model.

The second target condition is that the accuracy converges or a quantity of iterations reaches a target quantity, and is set by a person skilled in the art, which is not limited in this embodiment of the present disclosure.

In the embodiments of the present disclosure, sample human tissue images of a source domain and a target domain are obtained, and image conversion is performed on a human tissue image of the source domain according to an image distribution difference between the sample human tissue images of the two domains, to obtain a training sample for training a first image processing model. In this way, a second image processing model applicable to the target domain can be obtained, to process a human tissue image of the target domain. In this process, a target sample image obtained after conversion conforms to an image distribution rule of the human tissue image of the target domain, and carries a corresponding target processing result. Therefore, there is no need to manually re-label, thereby removing a manual labeling step, reducing labor costs, improving model training efficiency, and thus improving image processing efficiency. By obtaining the human tissue image of the target domain, the training sample can be automatically obtained through image conversion. The method has better universality and higher applicability.

Figure 5:
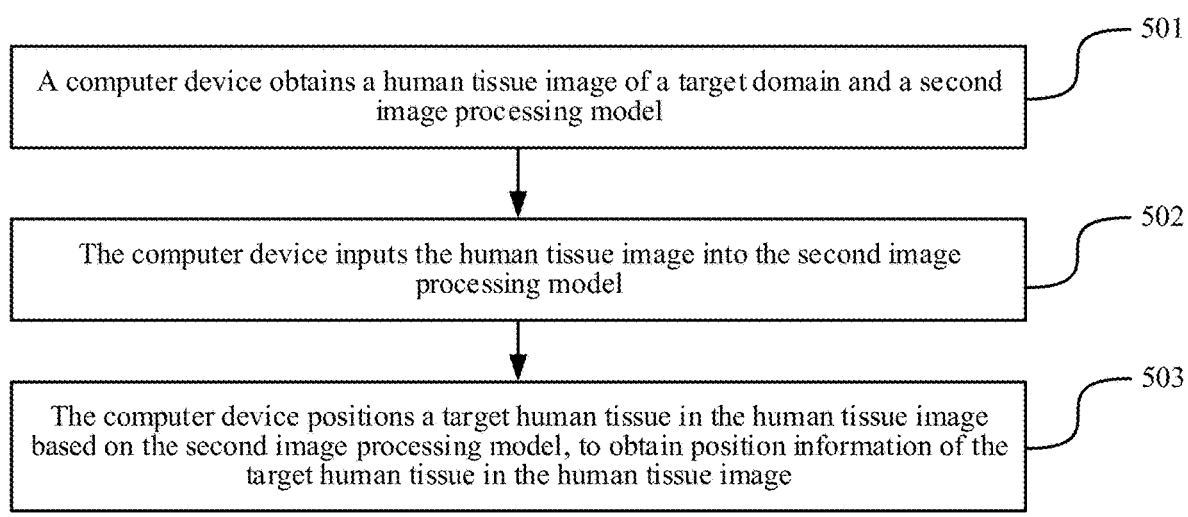
FIG. 5 is a schematic flowchart of an artificial intelligence-based image processing method according to embodiment(s) of the present disclosure.

FIG. 5 is a flowchart of an artificial intelligence-based image processing method according to an embodiment of the present disclosure. Referring to FIG. 5, the method may include the following steps.

501. Obtain, by a computer device, a human tissue image of a target domain and a second image processing model.

The human tissue image of the target domain is a to-be-processed image generated by the target domain, and a process of training the second image processing model is shown in the embodiment shown in FIG. 3. Details are not described herein.

In certain embodiment(s), the human tissue image is a colorectal image, and the target human tissue is a polyp. The image processing method provided in the present disclosure is used for positioning the polyp in the colorectal image.

502. Input, by the computer device, the human tissue image into the second image processing model.

When there is an image processing need, the computer device may invoke the trained second image processing model, and the second image processing model processes the human tissue image based on a trained model parameter.

503. Position, by the computer device, the target human tissue in the human tissue image based on the second image processing model, to obtain position information of the target human tissue in the human tissue image.

After the computer device inputs the human tissue image into the second image processing model, the second image processing model may process the human tissue image based on the trained model parameter. In certain embodiment(s), the image processing process is as follows: the second image processing model performs feature extraction on the human tissue image, to obtain an image feature of the human tissue image; and obtains a feature map of the human tissue image according to the image feature, each pixel in the feature map being used for indicating whether one region of the human tissue image includes the target human tissue; and obtains and outputs the position information of the target human tissue according to the feature map and a target offset. The image processing process is similar to step 204 in the embodiment shown in FIG. 2. Details are not described herein.

Figure 6:
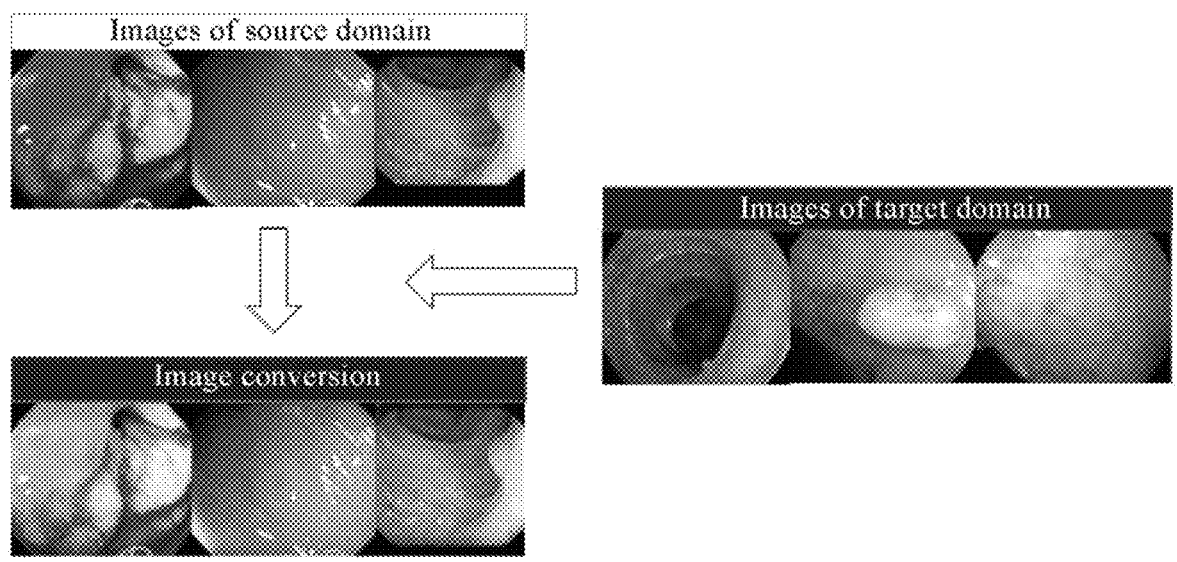
FIG. 6 is a schematic diagram of an image conversion process according to embodiment(s) of the present disclosure.
Figure 7:
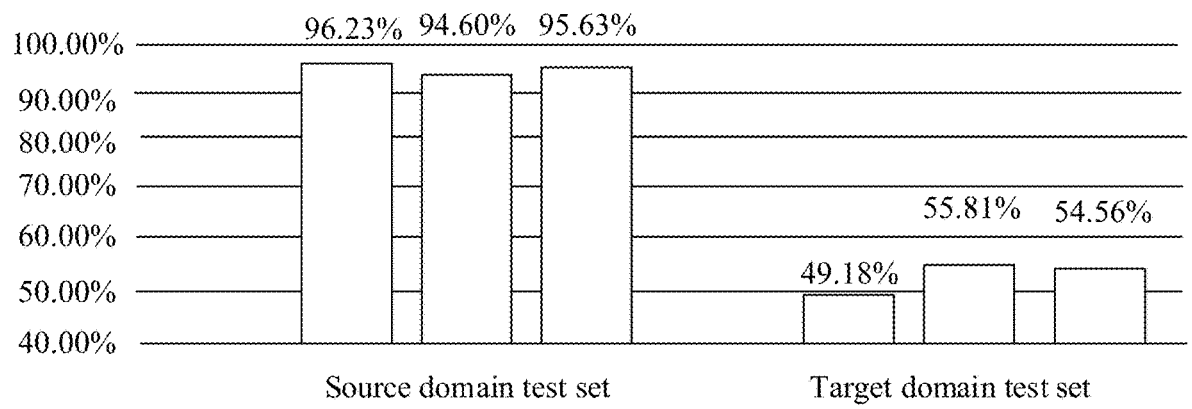
FIG. 7 is a schematic test result of an artificial intelligence-based image processing method according to embodiment(s) of the present disclosure.

A specific test result is provided below. FIG. 6 shows a form after sample images of a source domain are converted in a target domain. It can be seen from the figure that, after the sample images of the source domain are converted in the target domain, integrity of content is well preserved, and a style thereof is closer to the target domain. For the test result, as shown in FIG. 7, a source field (namely, the source domain) data indicates that a part of captured labeled data may be used as a source domain test set. Data of a hospital of which a polyp detection system is online is used as a target field (namely, the target domain) data, and a specific quantity of target domain data is captured and marked, to compare effects with the method provided in the present disclosure. In the manner provided in the present disclosure, a part of the labeled data is selected as a target domain test set. Model training is performed by using the manner provided in the present disclosure and the labeled target domain data respectively, and a detecting effect of the model obtained after training is performed by using the source domain test set and the target domain test set.

It is found in a test result obtained by using the source domain test set that, accuracy rates of test effects of a first image processing model, a third image processing model and a second image processing model obtained after training by using the labeled target domain data are respectively 96.23%, 94.60%, and 95.63%. It is found in a test result obtained by using the target domain test set that, performance of the first image processing model on the target domain test set is poor, and the accuracy rates thereof are merely 49.18%, 55.81%, and 54.56%. When the first image processing model is directly trained by using the labeled target domain data, the first image processing model achieves nearly 6% performance improvement on the target domain test set. By using the image processing method provided in the present disclosure, the first image processing model achieves nearly 5% performance improvement on the target domain test set without labeling the data. Therefore, by using the manner provided in the present disclosure, a result of model training is close to a result obtained by monitoring and training by using the labeled target domain data, labor costs are reduced, and training efficiency is improved.

In the above method, samples of the source domain are mapped to a form with the same distribution as the target domain, so that the labeled data in the target domain is "generated", and the generated labeled data is used to fine-tune the model, to improve a generalization capability of the model in the target domain. In scenarios where the above method is applicable to different hospitals, because there is no need to manually label and the universality is good, in a process that products are deployed in a target hospital in a large scale, when there is a large distribution difference between data generated by the target hospital and data used by model training, the model can be iterated quickly so that a processing effect of the model is significantly improved when the model processes the data generated by the target hospital.

In the embodiments of the present disclosure, sample human tissue images of a source domain and a target domain are obtained, and image conversion is performed on a human tissue image of the source domain according to an image distribution difference between the sample human tissue images of the two domains, to obtain a training sample for training a first image processing model. In this way, a second image processing model applicable to the target domain is obtained, to process a human tissue image of the target domain. In this process, a target sample image obtained after conversion conforms to an image distribution rule of the human tissue image of the target domain, and carries a corresponding target processing result. Therefore, there is no need to manually re-label, thereby removing a manual labeling step, reducing labor costs, improving model training efficiency, and thus improving image processing efficiency. By obtaining the human tissue image of the target domain, the training sample can be automatically obtained through image conversion. The method has better universality and higher applicability.

The technical solutions may be arbitrarily combined to form an optional embodiment of the present disclosure, and details are not described herein again.

Figure 8:
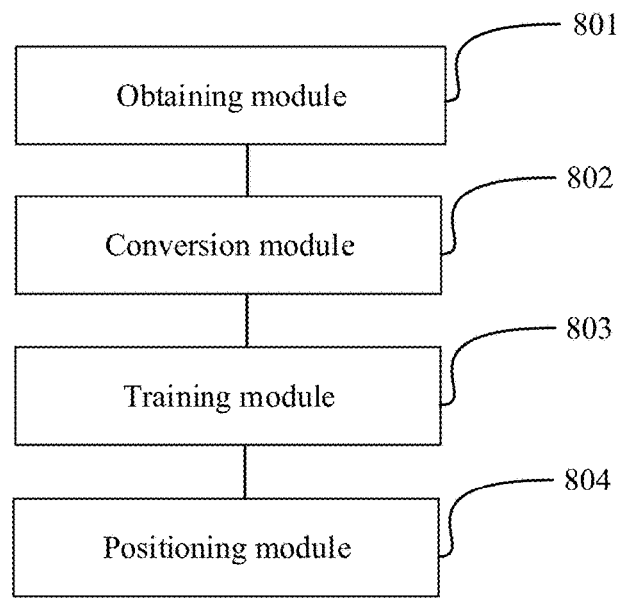
FIG. 8 is a schematic structural diagram of an artificial intelligence-based image processing apparatus according to embodiment(s) of the present disclosure.

FIG. 8 is a schematic structural diagram of an artificial intelligence-based image processing apparatus according to an embodiment of the present disclosure. Referring to FIG. 8, the apparatus includes: an obtaining module 801, configured to obtain a first sample image of a source domain and a second sample image of a target domain, the first sample image of the source domain carrying a corresponding target processing result, and the first sample image and the second sample image being sample human tissue images; a conversion module 802, configured to convert the first sample image into a target sample image that conforms to an image distribution rule of the second sample image according to an image distribution difference between the first sample image and the second sample image, the target sample image carrying a corresponding target processing result; a training module 803, configured to train a first image processing model based on the target sample image and the target processing result corresponding to the target sample image, to obtain a second image processing model; and a positioning module 804, configured to input, in response to obtaining a human tissue image of the target domain, the human tissue image into the second image processing model, position, by using the second image processing model, a target human tissue in the human tissue image, and output position information of the target human tissue in the human tissue image.

In some embodiments, the conversion module 802 is configured to: encode the first sample image according to an image distribution difference of a target encoding space and the first sample image on an image distribution rule, to obtain a first sample image code; and generate, according to an image distribution difference of the second sample image and the target encoding space on the image distribution rule, the target sample image that conforms to the image distribution rule of the second sample image based on the first sample image code.

In some embodiments, the conversion module 802 is configured to input the first sample image into an image conversion network, and perform, by using the image conversion network, operations of encoding and generating the image, to obtain the target sample image.

In some embodiments, the image conversion network includes an encoding network and a generation network; and the conversion module 802 is configured to: input the first sample image into the encoding network of the image conversion network, and encode, by using the encoding network, the first sample image according to the image distribution difference of the target encoding space and the first sample image on the image distribution rule, to obtain the first sample image code; and generate, by using the generation network according to the image distribution difference of the second sample image and the target encoding space on the image distribution rule, the target sample image that conforms to the image distribution rule of the second sample image based on the first sample image code.

In some embodiments, a process of training the image conversion network includes: inputting the first sample image and the second sample image into an initial image conversion network, and encoding, by using the initial image conversion network, the first sample image according to the image distribution difference of the target encoding space and the first sample image on the image distribution rule, to obtain the first sample image code; encoding the second sample image according to the image distribution difference of the target encoding space and the second sample image on the image distribution rule, to obtain a second sample image code; generating, according to the image distribution difference of the first sample image and the target encoding space on the image distribution rule, a third sample image and a fourth sample image based on the first sample image code and the second sample image code; generating, according to the image distribution difference of the second sample image and the target encoding space on the image distribution rule, a fifth sample image and a sixth sample image based on the first sample image code and the second sample image code; obtaining an image classification result of the first sample image, the second sample image, the third sample image, the fourth sample image, the fifth sample image, and the sixth sample image, the image classification result being used for indicating that an image is an original image or a generated image; and adjusting a network parameter of the initial image conversion network according to an accuracy rate of the image classification result until a first target condition is conformed, to obtain the image conversion network.

In some embodiments, the obtaining module 801 is further configured to respectively obtain a first similarity between the third sample image and the fourth sample image, a second similarity between the fifth sample image and the sixth sample image, a third similarity between the first sample image and the third sample image, a fourth similarity between the first sample image and the fifth sample image, a fifth similarity between the second sample image and the fourth sample image, and a sixth similarity between the second sample image and the sixth sample image.

The adjusting a network parameter of the initial image conversion network according to an accuracy rate of the image classification result until a first target condition is conformed includes: adjusting the network parameter of the initial image conversion network according to the accuracy rate of the image classification result, the first similarity, the second similarity, the third similarity, the fourth similarity, the fifth similarity, and the sixth similarity until the first target condition is conformed.

In some embodiments, the conversion module 802 is further configured to input the fourth sample image and the sixth sample image into the initial image conversion network, and encode, by using the initial image conversion network, the fourth sample image and the sixth sample image, to obtain a third sample image code and a fourth sample image code.

The obtaining module 801 is further configured to respectively obtain a seventh similarity between the third sample image code and the first sample image code and an eighth similarity between the fourth sample image code and the second sample image code.

The adjusting a network parameter of the initial image conversion network according to an accuracy rate of the image classification result until a first target condition is conformed further includes: adjusting the network parameter of the initial image conversion network according to the seventh similarity and the eighth similarity until the first target condition is conformed.

In some embodiments, the first target condition is that a difference between the accuracy rate of the image classification result and a target accuracy rate is less than a difference threshold; or the first target condition is that the difference between the accuracy rate of the image classification result and the target accuracy rate is less than the difference threshold, and the first similarity, the second similarity, the third similarity, the fourth similarity, the fifth similarity, and the sixth similarity converge; or the first target condition is that the difference between the accuracy rate of the image classification result and the target accuracy rate is less than the difference threshold, and the first similarity, the second similarity, the third similarity, the fourth similarity, the fifth similarity, the sixth similarity, the seventh similarity, and the eighth similarity converge; or the first target condition is that a quantity of iterations reaches a target quantity.

In some embodiments, the target accuracy rate is 50%.

In some embodiments, the training module 803 is configured to: input the target sample image into the first image processing model, position, by using the first image processing model, a target human tissue in the target sample image, and output predicted position information of the target human tissue in the target sample image; obtain accuracy of the predicted position information based on the predicted position information and target position information of the target human tissue in the target processing result; and adjust a model parameter of the first image processing model based on the accuracy until a second target condition is conformed, to obtain the second image processing model.

In some embodiments, the positioning module 804 is configured to: perform, by using the second image processing model, feature extraction on the human tissue image, to obtain an image feature of the human tissue image; obtain a feature map of the human tissue image according to the image feature, where each pixel in the feature map is used for indicating whether one region of the human tissue image includes the target human tissue; and obtain and output the position information of the target human tissue according to the feature map and a target offset.

In some embodiments, the human tissue image is a colorectal image; and the target human tissue is a polyp.

In the embodiments of the present disclosure, sample human tissue images of a source domain and a target domain are obtained, and image conversion is performed on a human tissue image of the source domain according to an image distribution difference between the sample human tissue images of the two domains, to obtain a training sample for training a first image processing model. In this way, a second image processing model applicable to the target domain can be obtained, to process a human tissue image of the target domain. In this process, a target sample image obtained after conversion conforms to an image distribution rule of the human tissue image of the target domain, and carries a corresponding target processing result. Therefore, there is no need to manually re-label, thereby removing a manual labeling step, reducing labor costs, improving model training efficiency, and thus improving image processing efficiency. By obtaining the human tissue image of the target domain, the training sample can be automatically obtained through image conversion. The method has better universality and higher applicability.

When the artificial intelligence-based image processing apparatus provided in the embodiment performs image processing, it is illustrated with an example of division of each functional module. In certain embodiment(s), the function distribution may be implemented by different functional modules, that is, an internal structure of the computer device is divided into different functional modules, to implement all or some of the functions described above. In addition, the artificial intelligence-based image processing apparatus provided in the embodiment has the same idea as the artificial intelligence-based image processing method embodiment. For a specific implementation process thereof, reference may be made to the artificial intelligence-based image processing method embodiment, and details are not described herein again.

Figure 9:
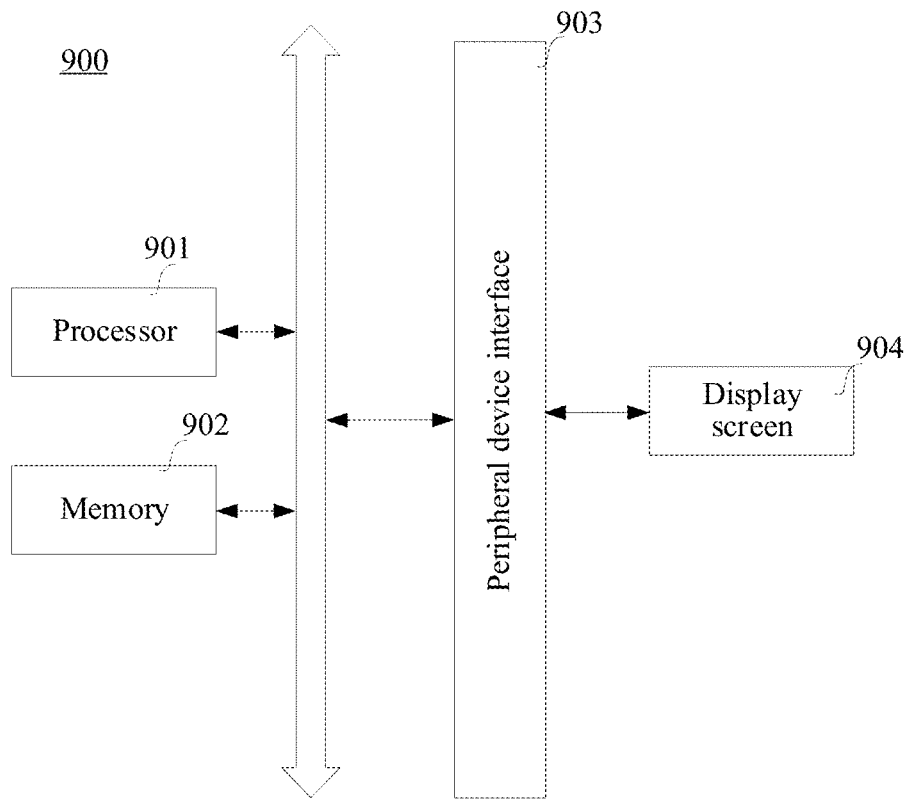
FIG. 9 is a schematic structural diagram of a terminal 900 according to embodiment(s) of the present disclosure.
Figure 10:
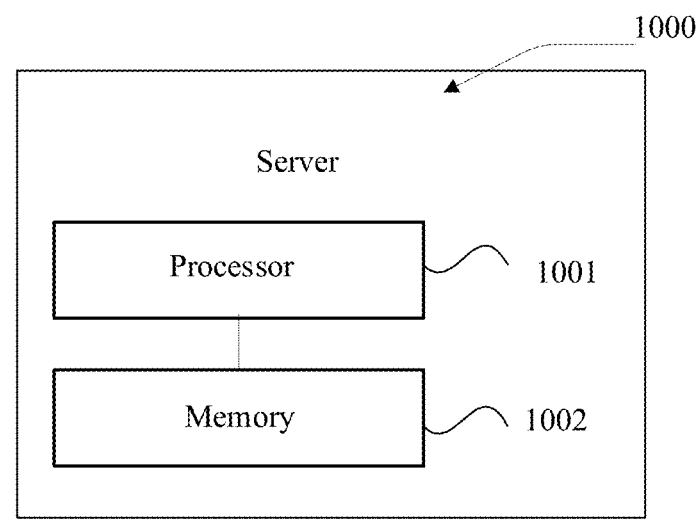
FIG. 10 is a schematic structural diagram of a server 1000 according to embodiment(s) of the present disclosure.

The computer device may be provided as a terminal shown in FIG. 9, or may be provided as a server shown in FIG. 10. This is not limited in this embodiment of the present disclosure.

FIG. 9 is a schematic structural diagram of a terminal 900 according to an embodiment of the present disclosure. The terminal 900 may be a smartphone, a tablet computer, a notebook computer, or a desktop computer. The terminal 900 may also be referred to as another name such as user equipment, a portable terminal, a laptop terminal, or a desktop terminal.

Generally, the terminal 900 includes a processor 901 and a memory 902.

The processor 901 may include one or more processing cores, for example, a 4-core processor or an 8-core processor. In some embodiments, the processor 901 may further include an artificial intelligence (AI) processor. The AI processor is configured to process computing operations related to machine learning.

The memory 902 may include one or more computer-readable storage media. The computer-readable storage media may be non-transient. In some embodiments, a non-transitory computer-readable storage medium in the memory 902 is configured to store at least one instruction, the at least one instruction being configured to be executed by the processor 901 to implement the artificial intelligence-based image processing method provided in the embodiments of the present disclosure.

In some embodiments, the terminal 900 may include a peripheral device interface 903 and at least one peripheral device. The processor 901, the memory 902, and the peripheral device interface 903 may be connected by using a bus or a signal cable. Each peripheral device may be connected to the peripheral device interface 903 by using a bus, a signal cable, or a circuit board. The peripheral device includes a display screen 904.

The peripheral device interface 903 may be configured to connect at least one peripheral device related to input/output (I/O) to the processor 901 and the memory 902.

The display screen 904 is configured to display a user interface (UI). The UI may include a graph, a text, an icon, a video, and any combination thereof. When the display screen 904 is a touch display screen, the display screen 904 is further capable of capturing touch signals on or above a surface of the display screen 904. The touch signal may be used as a control signal to be inputted to the processor 901 for processing. In this scenario, the display screen 904 may be further configured to provide a virtual button and/or a virtual keyboard, which is also referred to as a soft button and/or a soft keyboard.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

A person skilled in the art may understand that a structure shown in FIG. 9 constitutes no limitation on the terminal 900, and the terminal may include more or fewer components than those shown in the figure, or combine some components, or use a different component deployment.

FIG. 10 is a schematic structural diagram of a server 1000 according to an embodiment of the present disclosure. The server 1000 may vary greatly due to different configurations or performance, and may include one or more processors (such as CPUs) 1001 and one or more memories 1002. The memory 1002 stores at least one piece of program code, the at least one piece of program code being loaded and executed by the processor 1001 to implement the artificial intelligence-based image processing methods provided in the method embodiments. In certain embodiment(s), the server 1000 may also have a wired or wireless network interface, a keyboard, an input/output interface and other components to facilitate input/output. The server 1000 may also include other components for implementing device functions. Details are not described herein.

In some embodiments, a computer-readable storage medium, for example, a memory including at least one piece of program code is further provided. The at least one piece of program code may be executed by a processor in a computer device to implement the artificial intelligence-based image processing method in the embodiments. For example, the computer-readable storage medium may be a read-only memory (ROM), a random access memory (RAM), a compact disc read-only memory (CD-ROM), a magnetic tape, a floppy disk, an optical data storage device, or the like.

In some embodiments, a computer program product or a computer program is further provided, storing computer program code, the computer program code being stored in a computer-readable storage medium. A processor of a computer device reads the computer program code from the computer-readable storage medium, and the processor executes the computer program code, to cause the computer device to implement the artificial intelligence-based image processing method provided in the embodiments.

A person of ordinary skill in the art may understand that all or some of the steps of the embodiments may be implemented by hardware, or may be implemented by a program instructing relevant hardware. The program may be stored in a computer-readable storage medium. The storage medium may be a read-only memory, a magnetic disk, an optical disc, or the like.

The descriptions are merely optional embodiments of the present disclosure, but are not intended to limit the present disclosure. Any modification, equivalent replacement, or improvement made within the spirit and principle of the present disclosure shall fall within the protection scope of the present disclosure.

What is claimed is:

1. An artificial intelligence-based image processing method, comprising:
   obtaining a first sample image of a source domain and a second sample image of a target domain, the first sample image of the source domain carrying a corresponding target processing result, and the first sample image and the second sample image being sample human tissue images;
   encoding, by an encoding network of an image conversion network, the first sample image according to an image distribution difference between a target encoding space and the first sample image, to obtain a first sample image code;
   generating, by a generation network of the image conversion network, based on the first sample image code and according to an image distribution difference between the second sample image and the target encoding space, a target sample image that conforms to an image distribution rule of the second sample image, the target sample image carrying a corresponding target processing result;
   training a first image processing model based on the target sample image and the target processing result corresponding to the target sample image, to obtain a second image processing model; and
   inputting, in response to obtaining a human tissue image of the target domain, the human tissue image into the second image processing model, positioning, by the second image processing model, a target human tissue in the human tissue image, and outputting position information of the target human tissue in the human tissue image.

2. The method according to claim 1, wherein training the image conversion network comprises:
   inputting the first sample image and the second sample image into an initial image conversion network, and encoding, by the initial image conversion network, the first sample image according to the image distribution difference of the target encoding space and the first sample image on the image distribution rule, to obtain the first sample image code;
   encoding the second sample image according to the image distribution difference of the target encoding space and the second sample image on the image distribution rule, to obtain a second sample image code;
   generating, according to the image distribution difference of the first sample image and the target encoding space on the image distribution rule, a third sample image and a fourth sample image based on the first sample image code and the second sample image code;
   generating, according to the image distribution difference of the second sample image and the target encoding space on the image distribution rule, a fifth sample image and a sixth sample image based on the first sample image code and the second sample image code;
   obtaining an image classification result of the first sample image, the second sample image, the third sample image, the fourth sample image, the fifth sample image, and the sixth sample image, the image classification result being used for indicating that an image is an original image or a generated image; and
   adjusting a network parameter of the initial image conversion network according to an accuracy rate of the image classification result, to obtain the image conversion network.

3. The method according to claim 2, further comprising:
   respectively obtaining a first similarity between the third sample image and the fourth sample image, a second similarity between the fifth sample image and the sixth sample image, a third similarity between the first sample image and the third sample image, a fourth similarity between the first sample image and the fifth sample image, a fifth similarity between the second sample image and the fourth sample image, and a sixth similarity between the second sample image and the sixth sample image; and
   adjusting the network parameter comprises:
   adjusting the network parameter of the initial image conversion network according to the accuracy rate of the image classification result, the first similarity, the second similarity, the third similarity, the fourth similarity, the fifth similarity, and the sixth similarity.

4. The method according to claim 3, further comprising:
inputting the fourth sample image and the sixth sample image into the initial image conversion network, and encoding, by the initial image conversion network, the fourth sample image and the sixth sample image, to obtain a third sample image code and a fourth sample image code; and
respectively obtaining a seventh similarity between the third sample image code and the first sample image code and an eighth similarity between the fourth sample image code and the second sample image code; and
adjusting the network parameter further comprises:
adjusting the network parameter of the initial image conversion network according to the seventh similarity and the eighth similarity.

5. The method according to claim 4, wherein the first target condition is that a difference between the accuracy rate of the image classification result and a target accuracy rate is less than a difference threshold; or
the first target condition is that the difference between the accuracy rate of the image classification result and the target accuracy rate is less than the difference threshold, and the first similarity, the second similarity, the third similarity, the fourth similarity, the fifth similarity, and the sixth similarity converge; or
the first target condition is that the difference between the accuracy rate of the image classification result and the target accuracy rate is less than the difference threshold, and the first similarity, the second similarity, the third similarity, the fourth similarity, the fifth similarity, the sixth similarity, the seventh similarity, and the eighth similarity converge; or
the first target condition is that a quantity of iterations reaches a target quantity.

6. The method according to claim 1, wherein training the first image processing model comprises:
inputting the target sample image into the first image processing model, positioning, by using the first image processing model, a target human tissue in the target sample image, and outputting predicted position information of the target human tissue in the target sample image;
obtaining accuracy of the predicted position information based on the predicted position information and target position information of the target human tissue in the target processing result; and
adjusting a model parameter of the first image processing model based on the accuracy, to obtain the second image processing model.

7. The method according to claim 1, wherein positioning the target human tissue in the human tissue image comprises:
performing, by the second image processing model, feature extraction on the human tissue image, to obtain an image feature of the human tissue image;
obtaining a feature map of the human tissue image according to the image feature, each pixel in the feature map being used for indicating whether one region of the human tissue image comprises the target human tissue; and
obtaining and outputting the position information of the target human tissue according to the feature map and a target offset.

8. An artificial intelligence-based image processing apparatus, comprising: a memory storing computer program instructions; and a processor coupled to the memory and configured to execute the computer program instructions and perform:
obtaining a first sample image of a source domain and a second sample image of a target domain, the first sample image of the source domain carrying a corresponding target processing result, and the first sample image and the second sample image being sample human tissue images;
encoding, by an encoding network of an image conversion network, the first sample image according to an image distribution difference between a target encoding space and the first sample image, to obtain a first sample image code;
generating, by a generation network of the image conversion network, based on the first sample image code and according to an image distribution difference between the second sample image and the target encoding space, a target sample image that conforms to an image distribution rule of the second sample image, the target sample image carrying a corresponding target processing result;
training a first image processing model based on the target sample image and the target processing result corresponding to the target sample image, to obtain a second image processing model; and
inputting, in response to obtaining a human tissue image of the target domain, the human tissue image into the second image processing model, positioning, by the second image processing model, a target human tissue in the human tissue image, and outputting position information of the target human tissue in the human tissue image.

9. The apparatus of claim 8, wherein training the image conversion network includes:
inputting the first sample image and the second sample image into an initial image conversion network, and encoding, by the initial image conversion network, the first sample image according to the image distribution difference of the target encoding space and the first sample image on the image distribution rule, to obtain the first sample image code;
encoding the second sample image according to the image distribution difference of the target encoding space and the second sample image on the image distribution rule, to obtain a second sample image code;
generating, according to the image distribution difference of the first sample image and the target encoding space on the image distribution rule, a third sample image and a fourth sample image based on the first sample image code and the second sample image code;
generating, according to the image distribution difference of the second sample image and the target encoding space on the image distribution rule, a fifth sample image and a sixth sample image based on the first sample image code and the second sample image code;
obtaining an image classification result of the first sample image, the second sample image, the third sample image, the fourth sample image, the fifth sample image, and the sixth sample image, the image classification result being used for indicating that an image is an original image or a generated image; and
adjusting a network parameter of the initial image conversion network according to an accuracy rate of the image classification result, to obtain the image conversion network.

10. The apparatus of claim 9, wherein the processor is further configured to execute the computer program instructions and perform:

respectively obtaining a first similarity between the third sample image and the fourth sample image, a second similarity between the fifth sample image and the sixth sample image, a third similarity between the first sample image and the third sample image, a fourth similarity between the first sample image and the fifth sample image, a fifth similarity between the second sample image and the fourth sample image, and a sixth similarity between the second sample image and the sixth sample image; and adjusting the network parameter comprises:

adjusting the network parameter of the initial image conversion network according to the accuracy rate of the image classification result, the first similarity, the second similarity, the third similarity, the fourth similarity, the fifth similarity, and the sixth similarity.

11. The apparatus of claim 10, wherein the processor is further configured to execute the computer program instructions and perform:

inputting the fourth sample image and the sixth sample image into the initial image conversion network, and encoding, by the initial image conversion network, the fourth sample image and the sixth sample image, to obtain a third sample image code and a fourth sample image code; and respectively obtaining a seventh similarity between the third sample image code and the first sample image code and an eighth similarity between the fourth sample image code and the second sample image code; and adjusting the network parameter further comprises:

adjusting the network parameter of the initial image conversion network according to the seventh similarity and the eighth similarity.

12. The apparatus of claim 11, wherein the first target condition is that a difference between the accuracy rate of the image classification result and a target accuracy rate is less than a difference threshold; or the first target condition is that the difference between the accuracy rate of the image classification result and the target accuracy rate is less than the difference threshold, and the first similarity, the second similarity, the third similarity, the fourth similarity, the fifth similarity, and the sixth similarity converge; or the first target condition is that the difference between the accuracy rate of the image classification result and the target accuracy rate is less than the difference threshold, and the first similarity, the second similarity, the third similarity, the fourth similarity, the fifth similarity, the sixth similarity, the seventh similarity, and the eighth similarity converge; or the first target condition is that a quantity of iterations reaches a target quantity.

13. The apparatus of claim 8, wherein training the first image processing model includes:

inputting the target sample image into the first image processing model, positioning, by using the first image processing model, a target human tissue in the target sample image, and outputting predicted position information of the target human tissue in the target sample image;

obtaining accuracy of the predicted position information based on the predicted position information and target position information of the target human tissue in the target processing result; and adjusting a model parameter of the first image processing model based on the accuracy, to obtain the second image processing model.

14. A non-transitory computer-readable storage medium storing computer program instructions executable by at least one processor to perform:

obtaining a first sample image of a source domain and a second sample image of a target domain, the first sample image of the source domain carrying a corresponding target processing result, and the first sample image and the second sample image being sample human tissue images;

encoding, by an encoding network of an image conversion network, the first sample image according to an image distribution difference between a target encoding space and the first sample image, to obtain a first sample image code;

generating, by a generation network of the image conversion network, based on the first sample image code and according to an image distribution difference between the second sample image and the target encoding space, a target sample image that conforms to an image distribution rule of the second sample image, the target sample image carrying a corresponding target processing result;

training a first image processing model based on the target sample image and the target processing result corresponding to the target sample image, to obtain a second image processing model; and inputting, in response to obtaining a human tissue image of the target domain, the human tissue image into the second image processing model, positioning, by the second image processing model, a target human tissue in the human tissue image, and outputting position information of the target human tissue in the human tissue image.

* * * * *